(12) United States Patent
Oehm et al.

(10) Patent No.: US 9,145,283 B2
(45) Date of Patent: Sep. 29, 2015

(54) LIFTING APPARATUS WITH SAFETY DEVICE

(75) Inventors: Torsten Oehm, Wuppertal (DE); Hans-Günther Kastner, Wülfrath (DE)

(73) Assignee: SPG Packaging Systems GMBH, Hilden (DE)

( * ) Notice: Subject to any disclaimer, the term of this patent is extended or adjusted under 35 U.S.C. 154(b) by 753 days.

(21) Appl. No.: 13/403,205

(22) Filed: Feb. 23, 2012

(65) Prior Publication Data

US 2012/0210890 A1 Aug. 23, 2012

(30) Foreign Application Priority Data

Feb. 23, 2011 (DE) .......................... 10 2011 012 207

(51) Int. Cl.
| | |
|---|---|
| *B66F 3/18* | (2006.01) |
| *B66F 3/02* | (2006.01) |
| *B23Q 5/38* | (2006.01) |
| *B23Q 5/58* | (2006.01) |
| *B65B 13/18* | (2006.01) |
| *B65B 13/20* | (2006.01) |
| *B66F 17/00* | (2006.01) |

(52) U.S. Cl.
CPC . *B66F 3/02* (2013.01); *B23Q 5/385* (2013.01); *B23Q 5/58* (2013.01); *B65B 13/185* (2013.01); *B65B 13/20* (2013.01); *B66F 17/00* (2013.01)

(58) Field of Classification Search
USPC .................... 254/98, 103, 104, 105
See application file for complete search history.

(56) References Cited

U.S. PATENT DOCUMENTS

| | | | |
|---|---|---|---|
| 1,218,021 A | 3/1917 | Walther | |
| 3,762,235 A | 10/1973 | Splinter | |
| 3,934,680 A * | 1/1976 | Bishop .......................... | 187/206 |
| 4,046,019 A | 9/1977 | Phillips | |
| 4,076,104 A | 2/1978 | Bishop et al. | |
| 4,976,336 A * | 12/1990 | Curran .......................... | 187/208 |
| 7,207,419 B2 * | 4/2007 | Fore et al. ...................... | 187/208 |
| 2006/0144653 A1 | 7/2006 | Eberle et al. | |

FOREIGN PATENT DOCUMENTS

| | | |
|---|---|---|
| DE | 29805196 U1 | 7/1998 |
| EP | 1355074 A1 | 10/2003 |
| FR | 2710361 A1 | 3/1995 |

OTHER PUBLICATIONS

EP Search Report for EP 12000608, dated May 23, 2012.

* cited by examiner

*Primary Examiner* — Lee D Wilson
*Assistant Examiner* — Shantese McDonald
(74) *Attorney, Agent, or Firm* — Levenfeld Pearlstein, LLC

(57) ABSTRACT

A lifting apparatus having a tool, which is vertically displaceable by means of a motor and to which at least a first toothed wheel is coupled in terms of movement. The toothed wheel engages over the vertical path of displacement in a stationary toothed rack. The lifting gear includes a safety device having a blocking element which, in a locked position, stops the tool from moving in the direction of gravity, at least when the lifting apparatus is deenergized, wherein the blocking element stops the tool over the vertical path of displacement, at basically any level in any vertical position, and is held against a restoring force in an unblocking position with vertical movement of the tool, and the restoring force pushes the blocking element into its locked position, at least when the lifting apparatus is deenergized.

9 Claims, 3 Drawing Sheets

LIFTING APPARATUS WITH SAFETY DEVICE

The invention relates to a lifting apparatus having a tool which is vertically displaceable by means of a motor and to which at least a first toothed wheel is coupled in terms of movement, said toothed wheel engaging over the vertical path of displacement in a stationary toothed rack, the lifting gear comprising a safety device having a blocking element which, in a locked position, stops the tool from moving in the direction of gravity, at least when the lifting apparatus is deenergized.

Various embodiments of various types of lifting gear for various purposes have long been known from unpublished prior art.

Lifting gears are used, inter alia, in "strapping machines". Such strapping machines are used to strap together packaged goods, for example newspapers or corrugated board, by means of a strip so as to ensure secure transport. For example, the applicant has thus developed and sells strapping machines for corrugated board, these machines comprising a packing table on which two vertical supports are arranged at a distance from one another and oriented parallel to one another. A vertical guide for a "pressing plate" is arranged on the supports and has a toothed rack. The pressing plate itself has at least one motor, which, via a shaft, drives toothed wheels cooperating with the toothed racks. The pressing plate is thus vertically displaceable and can compress a stack of corrugated board before the actual strapping process so as to ensure a more favorable packaged volume. In the example of the strapping machine, the lifting gear according to the invention is consequently formed by a motor, toothed wheel, toothed rack and tool.

It may be that people have to enter the danger zone below the tool of the lifting gear, for example below the pressing plate, for maintenance purposes or in order to rectify faults. A twofold safety device is provided for this purpose. The system is first switched off, that is to say the current feed is disconnected. The system is consequently inoperable and cannot be started up accidentally by another person. Systems with lifting gears also generally have a second, mechanical safety device which prevents the tool, in the example of the pressing plate, from being lowered when the system is deenergized.

The invention can also be used, inter alia, in electrically operated presses, in which the crosshead of the press is moved vertically along a toothed rack.

Such safety devices may be bolts inserted into the path of displacement of the tool, said bolts preventing movement. Alternatively, systems comprise toothed bars in which pawls engage to safeguard against unintended vertical movement. Lastly, it is also known, inter alia, in strapping machines of the design described in the introduction, for a person to insert a toothed rack portion into the toothed rack necessary for the vertical movement, beneath the toothed wheel, in such a way that the toothings of the toothed rack portion and of the toothed rack engage one another in a comb-like manner. The path of movement of the toothed wheel is thus blocked along the toothed rack. An undesired advancing of the tool is therefore effectively prevented.

The safety devices in the prior art have clear disadvantages. Toothed bars with engaging pawls or safety bolts generally merely allow the tool to be blocked at certain heights. The tool can therefore merely be held at certain levels.

Securing of the tool at practically any level is indeed ensured with the latter-mentioned safety device by means of a toothed rack portion, but in this case a person must already have entered the danger zone of the tool before said tool is secured.

The object of the invention is to create a safety device for lifting gears, in particular in strapping machines, said safety device blocking the tool in any position of the vertical path of displacement without a person having to enter the danger zone of the tool for this purpose.

The object is achieved by a lifting apparatus in particular having the characterizing features in accordance with which the blocking element stops the tool over the vertical path of displacement, at basically any level in any vertical position, and is held against a restoring force in an unblocking position with vertical movement of the tool, and the restoring force pushes the blocking element into its locked position, at least when the lifting apparatus is switched off (deenergized).

The main advantage of the invention initially lies in the fact that the tool can be secured in practically any vertical position. This considerably facilitates servicing and maintenance operations carried out on the tool. The tool can be secured in the most favorable position depending on the maintenance operation and the necessary ergonomics. In addition, the safety device is activated as soon as the lifting device has been deenergized In the operating state, the blocking element is held actively against a restoring force in a position affording vertical movement. When deenergized, the restoring force ensures that the blocking element automatically returns into the locked position and secures the tool against movement in the direction of gravity. In this respect, nobody has to enter the danger zone to secure the tool.

In a preferred embodiment the lifting apparatus is characterized in that the first toothed wheel is part of the safety device, and the blocking element cooperates with the first toothed wheel in the locked position.

The safety device can be designed particularly simply owing to the use of the first toothed wheel as part of the safety device, this toothed wheel normally also being the driving toothed wheel.

An embodiment is further preferred in which the first toothed wheel is engaged with the blocking element, both in the locked position and with vertical movement of the tool.

Owing to the permanent engagement of the blocking element in the first toothed wheel, the safety device can be activated with a decidedly short latent period.

Furthermore, a second toothed wheel engages in the first toothed wheel and, as a result, executes a rotary movement in a direction opposite the direction of rotation of the first toothed wheel, in particular if the blocking element is formed by the second toothed wheel.

Owing to the above-mentioned design of the safety device, the invention utilizes the simple, yet very effective mechanical relationship between toothed wheels engaging one another. Toothed wheels engaging directly one another turn in opposite directions in this case. If both toothed wheels engage the same toothed rack, all movement is blocked. In this respect, the safety device thus formed is formed in a decidedly simple, but also effective manner, which ensures the necessary functional reliability.

An embodiment in which the second toothed wheel is arranged on a coupling part which prevents the second toothed wheel from engaging the toothed rack with vertical movement of the tool, but which brings the second toothed wheel into engagement with the toothed rack when the safety device is activated, is particularly preferred.

The coupling part is preferably designed as a lever, by means of which the second toothed wheel acting as a blocking element is held out of engagement with the toothed rack.

Further embodiments of the invention are defined in the disclosure. In addition, the invention will be described with the help of the following exemplary embodiment with reference to the accompanying drawings, in which.

Figure 1:
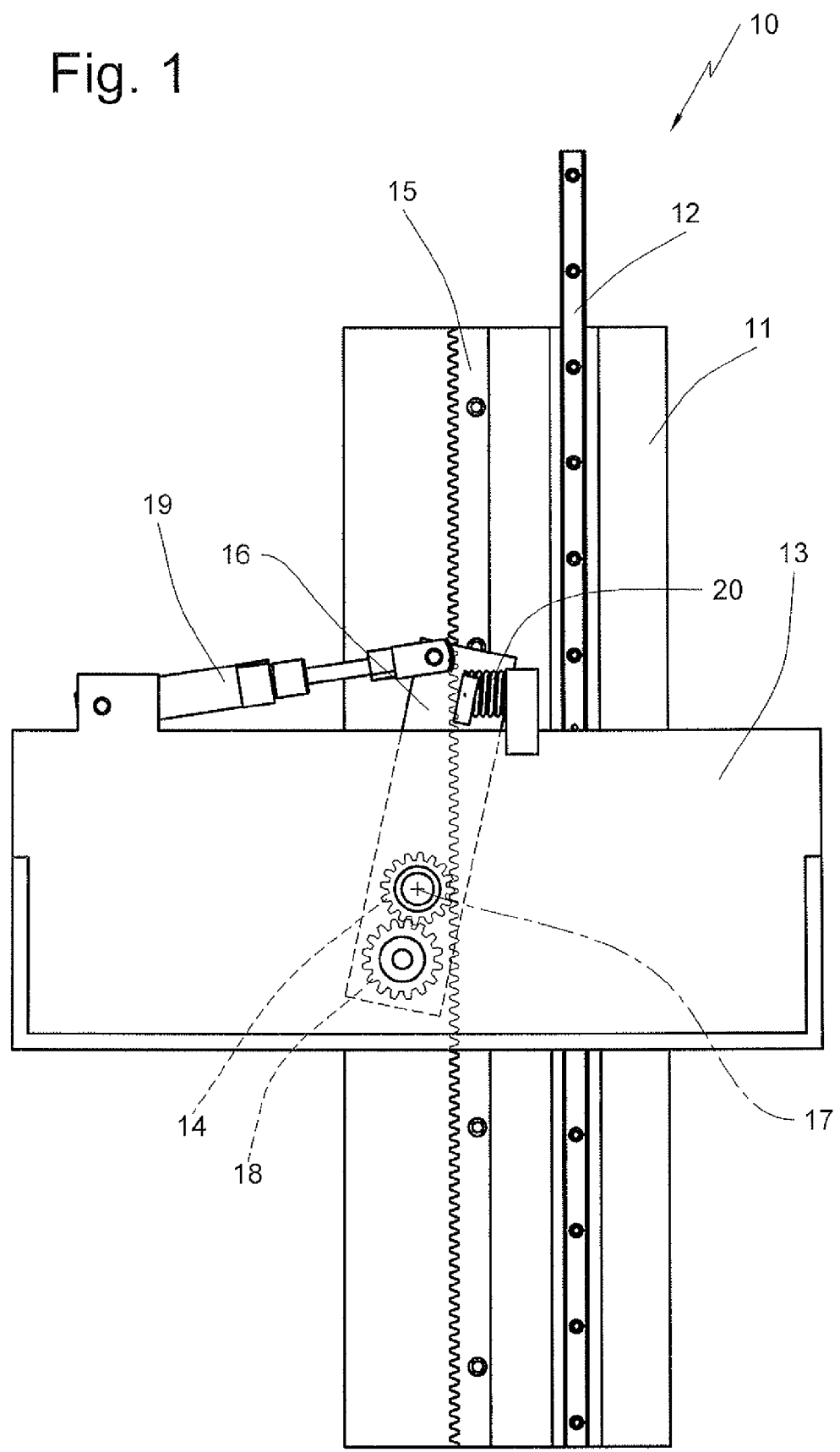
FIG. 1 shows a vertical partial sectional view through a lifting apparatus according to the invention.

In the illustrations, a lifting apparatus is denoted on the whole by reference numeral 10.

The lifting apparatus 10 firstly has a support 11, to which a guide strip 12 is attached. The tool 13 can be moved up and down in a vertical direction along the guide strip 12 by means of a drive.

The drive, which is not shown in this case, acts on a first toothed wheel 14, which engages in a toothed rack 15 which is arranged on the support 11 vertically and parallel to the guide strip 12.

The safety device of the lifting apparatus 10 firstly has a coupling part 16, which will also be referred to hereinafter as a pivoted lever 16. The pivoted lever 16 comprises a pivot axis 17 which coincides with the axis of the first toothed wheel 14. A second toothed wheel is arranged rotatably on the pivoted lever 16 and engages in the first toothed wheel 14. The second toothed wheel 18 forms the blocking element and is therefore also referred to as such hereinafter.

An adjustment device 19 in the form of a pneumatic cylinder engages opposite the blocking element 18. The pneumatic cylinder 19 is supported at the other end on the tool 13 itself. In addition, a resilient element 20 in the form of a compression spring, which is likewise supported in abutment on the tool 13, is additionally located in the region of the arrangement of the cylinder 19 on the pivoted lever 16. The compression spring 20 exerts a restoring force on the pivoted lever 16 and can move the pivoted lever 16 against the action of the pneumatic cylinder 19 into a locked position. In the locked position, the second toothed wheel 18 engages in the toothed rack 15 at the same time as the first toothed wheel 14.

The function of the safety device will now be described with the help of FIGS. 2 and 3. These figures merely show the basic components of the safety device and omit in particular the tool 13, the support 11 and the guide strip 12.

Figure 2:
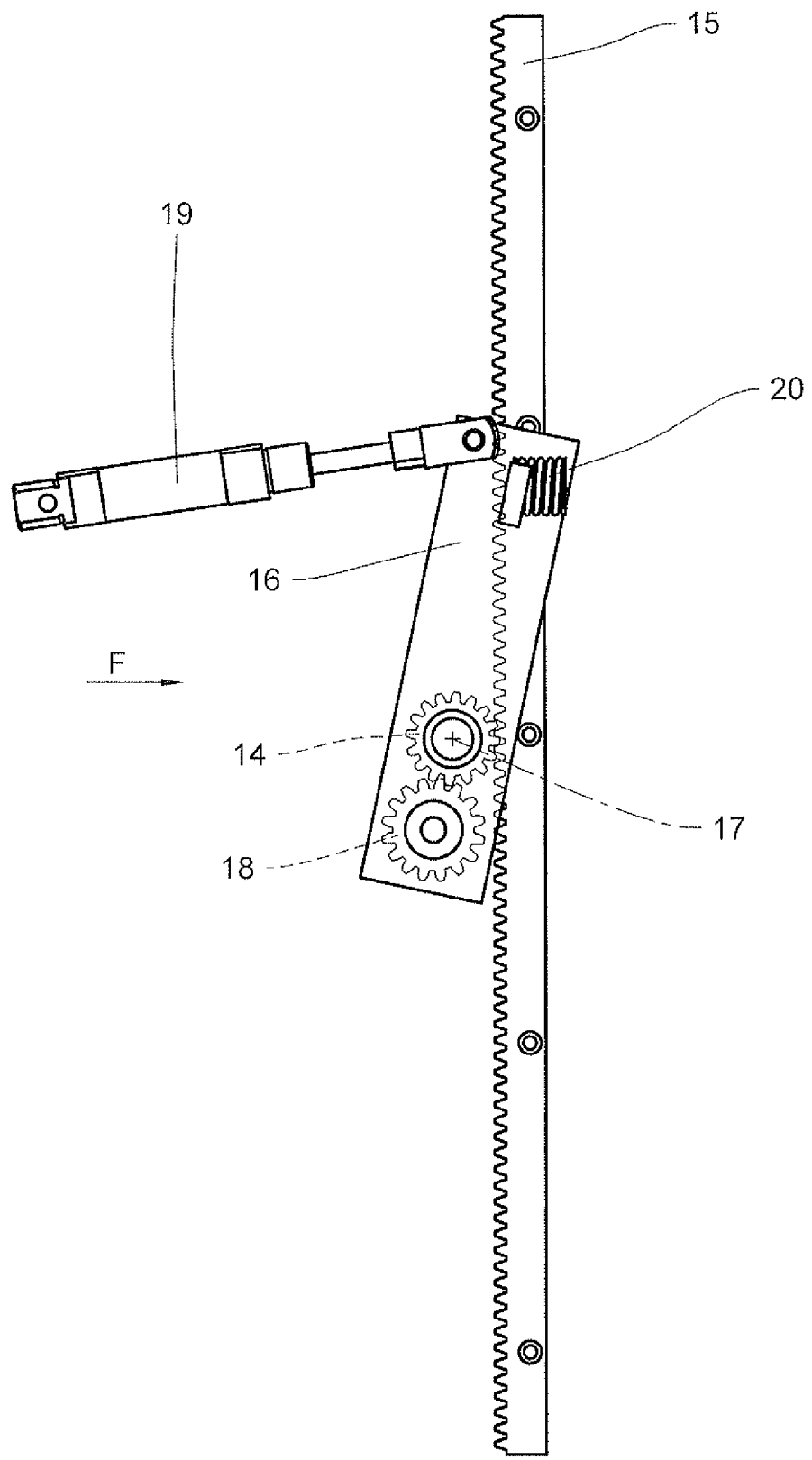
FIG. 2 shows a side view of the safety device in the free-running position.
Figure 3:
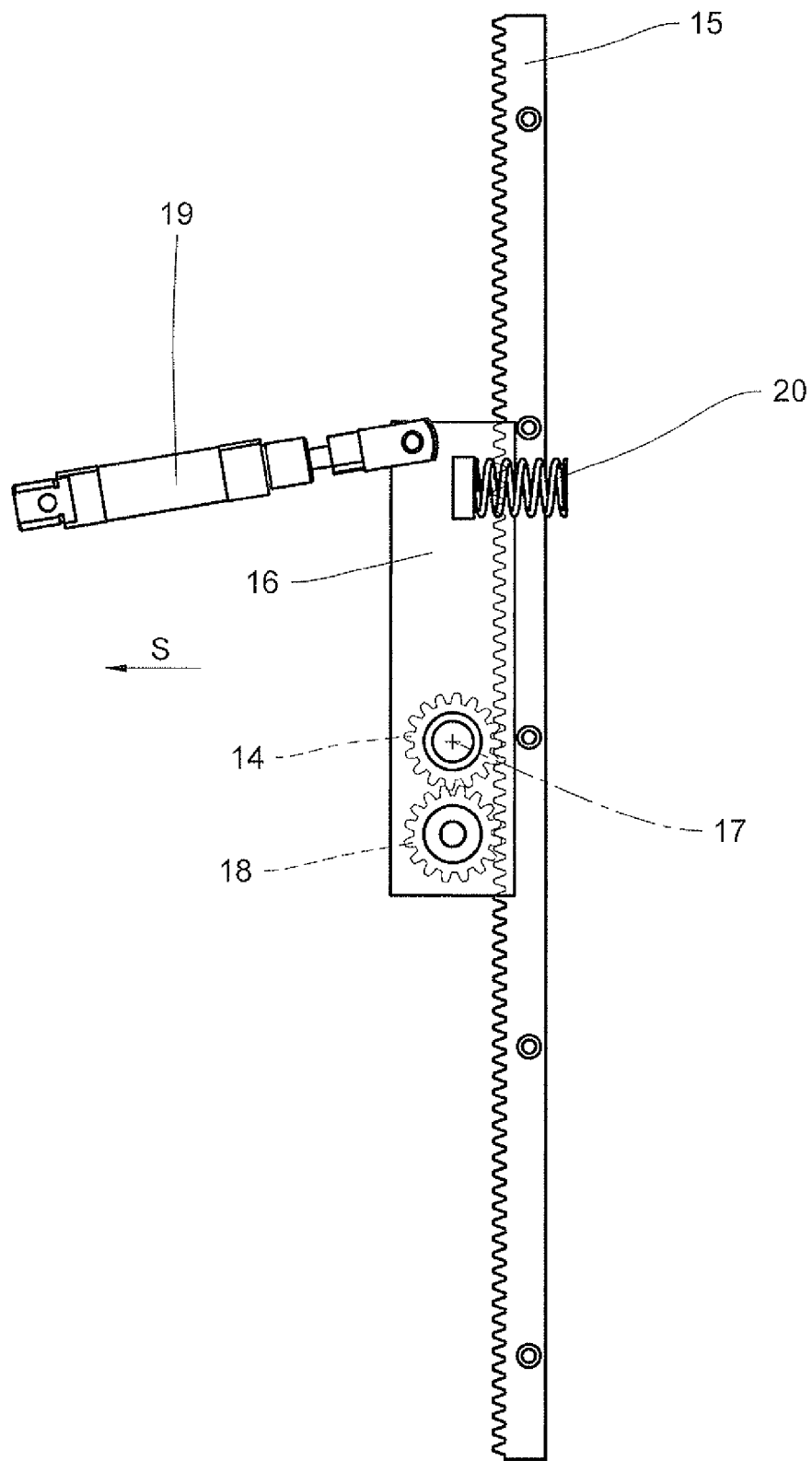
FIG. 3 shows an illustration according to FIG. 1 in the locked position.

In FIG. 2 the safety device is illustrated in its release position. In this case the pneumatic cylinder 19 acts actively against the restoring force of the compression spring 20 and moves the pivoted lever in the direction of the arrow F. Compressed air, which is produced by a compressor, is required to actively move the pneumatic cylinder. The compressor is connected to the system's main current supply. The first toothed wheel 14 is rotated by an electric motor, which is how the tool 13 (not shown) can move up and down depending on the direction of rotation. The second toothed wheel engaging the first toothed wheel 14 turns in a direction opposite that of the first toothed wheel 14. The toothed wheels 14 and 18 are permanently in mutual engagement.

If the main current feed to the lifting apparatus 10 is interrupted, for example for maintenance and servicing purposes, the air feed into the pneumatic cylinders 19 is cut. As a result, the compression spring 20 pushes the pneumatic cylinder 19 back in the direction S and pivots the pivoted lever 16 about its pivot axis 17. At the end of the pivoting movement, the second toothed wheel 18 engages as a blocking element the toothed rack 15 and the toothed wheel 14 at the same time. Due to the mutual toothed wheel movement with simultaneous engagement in the toothed rack 15, any vertical movement of the tool is reliably obstructed. The pneumatic cylinder can be pressurized as soon as the main current feed is activated again, and the safety device can move into the release position.

The reaction time between the interruption of the current feed to the lifting apparatus 10 and the reaching of the locked position of the blocking element 18 is dependent on the conditions of use. In theory, it is conceivable that the blocking element 18 can engage practically without delay, but this is undesirable, for example in the case of pressing plates of strapping machines. The moved masses and the technical requirements in terms of control necessitate a delay between the switching off of the main current feed and the engagement of the blocking element 18 so that the pressing plate can first come to a standstill. Otherwise, there is a risk of damage to the driving components.

Alternative adjustment devices 19, such as hydraulic cylinders, spindles, lifting magnets or servomotors, are conceivable. The compression spring 20 or a resilient element 20 can also be arranged in a completely different manner.

To summarize, the invention provides a safety device for lifting gears, said device being able to secure a tool against movement in practically any vertical position in the event of servicing or maintenance, and being of simple design.

The invention is therefore implemented in a strapping machine having a packing table and two supports arranged on the packing table parallel to one another and at a distance from one another, these supports being provided with toothed racks in which toothed wheels of a pressing plate engage, said pressing plate being vertically displaceable by means of a motor, a safety device being provided and having a blocking element which, in a locked position, prevents a vertical movement of the pressing plate following the direction of gravity, at least when the strapping machine is deenergized, wherein the blocking element can hold the pressing plate at basically any level in any vertical position.

The blocking element is held against a restoring force in a position allowing vertical movement; when the strapping machine is deenergized the blocking element is held in its locked position by the restoring force.

The blocking element is formed by an additional toothed wheel. The additional toothed wheel is permanently engaged with the at least one toothed wheel of the pressing plate. In its locked position, the additional toothed wheel engages simultaneously with one of the toothed wheels of the pressing plate and the toothed rack.

LIST OF REFERENCE SIGNS

10 lifting apparatus
11 support
12 guide strip
13 tool
14 first toothed wheel
15 toothed rack
16 coupling part/pivoted lever
17 pivot axis
18 second toothed wheel/blocking element
19 adjustment device/cylinder
20 resilient element/compression spring
F direction
S direction

The invention claimed is:

1. A lifting apparatus having a tool, which is vertically displaceable by means of a motor and to which at least a first toothed wheel rotatable on an axis is coupled in terms of movement, said toothed wheel engaging over the vertical path of displacement in a stationary toothed rack, the lifting apparatus comprising a safety device having a pivoted lever having a pivot axis that coincides with the axis of the first toothed wheel and a blocking element arranged rotatably on the pivoted lever which, in a locked position, stops the tool from moving in the direction of gravity, at least when the lifting apparatus is deenergized, an adjustment device engaging an opposite end of the pivoted lever from the blocking element and configured to exert a holding force on the pivoted lever, and a resilient element engaging the pivoted lever and configured to exert a restoring force on the pivoted lever opposing the holding force, wherein the blocking element stops the tool over the vertical path of displacement, at basically any level in any vertical position, and is held against the restoring force in an unblocking position with vertical movement of the tool, and the restoring force pushes the blocking element into its locked position, at least when the lifting apparatus is deenergized.

2. The lifting apparatus as claimed in claim 1, wherein the first toothed wheel is part of the safety device, and the blocking element cooperates with the first toothed wheel in the locked position.

3. The lifting apparatus as claimed in claim 1, wherein the first toothed wheel is engaged with the blocking element, both in the locked position and with vertical movement of the tool.

4. The lifting apparatus as claimed in claim 1, wherein the first toothed wheel forms a driving toothed wheel, by means of which the tool is vertically displaceable.

5. A lifting apparatus having a tool, which is vertically displaceable by means of a motor and to which at least a first toothed wheel is coupled in terms of movement, said toothed wheel engaging over the vertical path of displacement in a stationary toothed rack, the lifting apparatus comprising a safety device having a blocking element which, in a locked position, stops the tool from moving in the direction of gravity, at least when the lifting apparatus is deenergized, wherein the blocking element stops the tool over the vertical path of displacement, at basically any level in any vertical position, and is held against a restoring force in an unblocking position with vertical movement of the tool, and the restoring force pushes the blocking element into its locked position, at least when the lifting apparatus is deenergized, wherein a second toothed wheel engages in the first toothed wheel and, as a result, executes a rotary movement in a direction opposite a direction of rotation of the first toothed wheel.

6. The lifting apparatus as claimed in claim 5, wherein the blocking element is formed by the second toothed wheel.

7. The lifting apparatus as claimed in claim 5, wherein the second toothed wheel is arranged on a coupling part which prevents the second toothed wheel from engaging in the toothed rack with vertical movement of the tool, but which brings the second toothed wheel into engagement with the toothed rack when the safety device is activated.

8. The lifting apparatus as claimed in claim 7, wherein the second toothed wheel is held out of engagement with the toothed rack against a restoring force.

9. The lifting apparatus as claimed in claim 5, wherein, in the locked position, the second toothed wheel is simultaneously engaged with the toothed rack and the first toothed wheel.

\* \* \* \* \*